Oct. 3, 1950  J. B. SNOW  2,524,486
AUXILIARY ACCELERATOR PEDAL ACTUATOR
Filed Aug. 2, 1948

James B. Snow
INVENTOR.

Patented Oct. 3, 1950

2,524,486

UNITED STATES PATENT OFFICE 2,524,486

AUXILIARY ACCELERATOR PEDAL ACTUATOR

James B. Snow, Springfield, Ill.

Application August 2, 1948, Serial No. 41,937

1 Claim. (Cl. 74—480)

The present invention relates to new and useful improvements in an actuator for the foot throttle or accelerator of motor vehicles whereby the accelerator may be actuated by either foot of the driver, to thus relieve the driver of the strain of constant accelerator operation by one foot.

An important object of the invention is to provide an accelerator pedal actuator by means of which the accelerator pedal may be actuated by either foot of the driver and embodying means whereby the auxiliary pedal actuator may be raised into an inactive position by either foot of the driver, when desired.

A still further object is to provide a device of this character of simple and practical construction, which is efficient and reliable in operation, relatively inexpensive to manufacture, which may be easily and quickly installed in operative position upon an automobile without necessitating any changes or alterations with the construction thereof and which is otherwise well adapted for the purposes for which the same is intended.

Other objects and advantages reside in the details of construction and operation as more fully hereinafter described and claimed, reference being had to the accompanying drawings forming part hereof, wherein like enumerals refer to like parts throughout, and in which:

Figure 1:
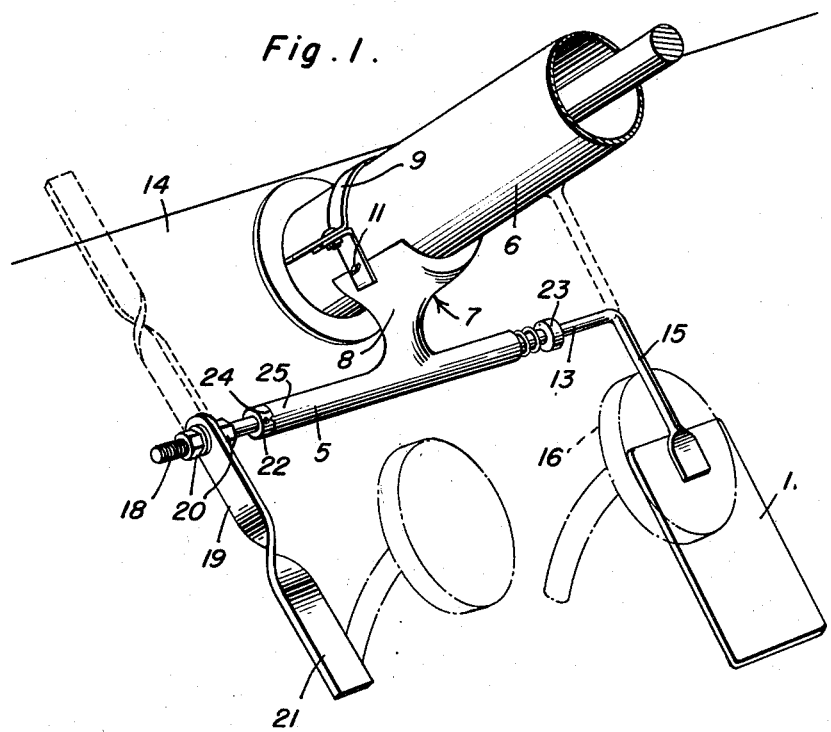
Figure 1 is a perspective view with parts broken away and shown in section.
Figure 2:
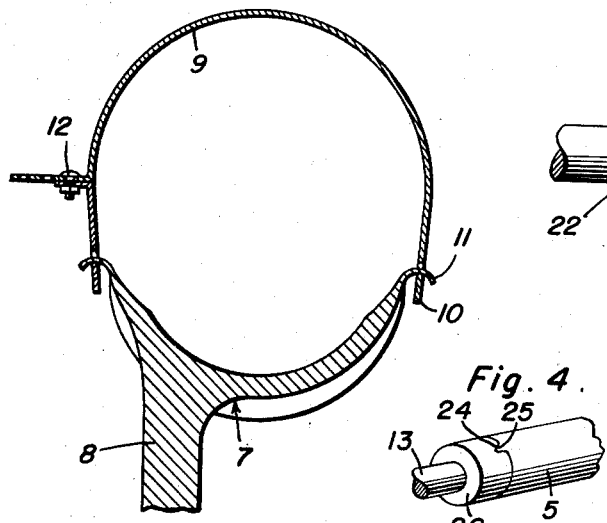
Figure 2 is an enlarged vertical sectional view of the steering post clamp for attaching the accelerator pedal actuator thereto.
Figure 3:
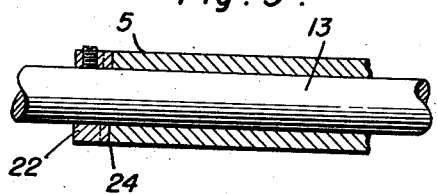
Figure 3 is an enlarged fragmentary longitudinal sectional view of the rocking shaft for the actuator and the sleeve for supporting the same.
Figure 4:
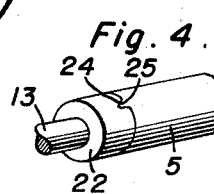
Figure 4 is a fragmentary perspective view of the lock for the shaft.

Referring now to the drawings in detail wherein for the purpose of illustration I have disclosed a preferred embodiment of the invention the numeral 5 designates a sleeve which is supported in a horizontal position under a steering post 6 of a motor vehicle by means of a suitable clamp device designated generally at 7 and which includes a lower saddle 8 suitably fixed to the sleeve and engaging the under side of the steering post 6 and an adjustable resilient metal clamping band 9 having its ends formed with openings 10 receiving downwardly curved lugs 11 at the edges of the lower clamping member 8. The clamping band or strap 9 is of sectional construction with the sections thereof secured to each other in adjusted position by a bolt and nut 12.

A shaft 13 is rockably supported in sleeve 5 in a horizontal position above the floor board 14 of the motor vehicle and with the ends of the shaft projecting outwardly at opposite ends of the sleeve. One end of shaft 13 is bent at right angles as shown at 15 to project rearwardly from the steering post 6 and overlies the accelerator pedal 16 of the vehicle. A plate 17 is welded or otherwise suitably secured to the angularly bent arm 15 of the shaft to rest on the upper surface of the accelerator pedal 16 and to provide increased area for depressing the pedal.

The other end of shaft 13 is threaded as shown at 18 and on which an arm 19 of strap metal is threadedly connected and secured in a vertically adjusted position by nuts 20 threaded on the shaft at opposite sides of the arm 19. The arm 19 projects rearwardly in parallelism to accelerator pedal arm 15 and the rear end of arm 19 is twisted to provide a flat surface 21 at its rear end to thus form an auxiliary accelerator actuating pedal.

A pair of collars 22 and 23 are secured on shaft 13 outwardly at the ends of sleeve 5, the collar 22 having a notch 24 in its opposed side receiving a V-shaped lug 25 on the adjacent end of sleeve 5. A coil spring 26 is positioned on shaft 13 between the collar 23 and the adjacent end of sleeve 5 to hold the lug 25 engaged in notch 24. The notch 24 and lug 25 are positioned to hold the arms 15 and 19 locked in a raised or inactive position (as shown by the dotted lines in Figure 1) when the auxiliary pedal 21 is not in use.

In the operation of the device, the sleeve 5 is held in a desired vertically adjusted position adjacent the lower end of steering post 6 by clamp 9 and with the accelerator actuating arm 15 and plate 17 resting on top of accelerator pedal 16 and with the auxiliary pedal 21 positioned to the left and free of any of the other control parts of the vehicle.

The pedal 21 may thus be depressed by the left foot of the driver to rock shaft 13 and cause a depressing action of pedal actuating arm 15 and plate 17 to depress the accelerator pedal 16. The plate 17 may be used by the right foot of the driver to also depress the accelerator, interchangeably with left pedal 21.

Either pedal 21 or arm 15 and plate 17 may be raised by engaging one foot of the driver thereunder and swung forwardly into an inactive position free of pedal 16.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An auxiliary throttle control for motor vehicles comprising a sleeve, means securing the sleeve in a horizontal position to a vehicle steering post, an L-shaped rod rockably mounted in the sleeve and projecting outwardly at each end thereof, one end of the rod having an angular arm, a foot plate secured to the angular arm for loosely resting on an accelerator pedal for operation by the right foot of a person, the other end of the rod being threaded, a second arm parallel to the first arm and composed of a metal strap twisted at its central portion to provide a vertical edgewise inner end swingably adjustable on the threaded end of the rod and a horizontal edgewise outer end forming a foot plate, nuts threaded on the rod holding the second arm in position for operation by the left foot of a person, and means locking the arms to the sleeve in a raised position.

JAMES B. SNOW.

REFERENCES CITED

The following references are of record in the file of this patent:

UNITED STATES PATENTS

| Number | Name | Date |
|---|---|---|
| 851,680 | Done | Apr. 30, 1907 |
| 907,053 | Huddle | Dec. 15, 1908 |
| 1,446,946 | Surbeck | Feb. 27, 1923 |
| 1,476,398 | Frederick | Dec. 4, 1923 |
| 1,856,069 | Dina | May 3, 1932 |
| 1,886,128 | Small | Nov. 1, 1932 |
| 1,889,685 | McIntyre | Nov. 29, 1932 |
| 2,084,932 | Allen | June 22, 1937 |
| 2,175,772 | Gintling | Oct. 10, 1939 |
| 2,253,850 | Fisher | Aug. 26, 1941 |